United States Patent
Rentsch-Smith

(10) Patent No.: US 9,405,027 B2
(45) Date of Patent: Aug. 2, 2016

(54) ATTENUATING NOISE ACQUIRED IN AN ENERGY MEASUREMENT

(75) Inventor: Susanne Rentsch-Smith, Hove (GB)

(73) Assignee: WESTERNGECO L.L.C., Houston, TX (US)

( * ) Notice: Subject to any disclaimer, the term of this patent is extended or adjusted under 35 U.S.C. 154(b) by 769 days.

(21) Appl. No.: 13/592,107

(22) Filed: Aug. 22, 2012

(65) Prior Publication Data

US 2013/0182533 A1 Jul. 18, 2013

Related U.S. Application Data

(60) Provisional application No. 61/585,921, filed on Jan. 12, 2012.

(51) Int. Cl.
*G01V 1/36* (2006.01)
*G01V 1/38* (2006.01)

(52) U.S. Cl.
CPC *G01V 1/38* (2013.01); *G01V 1/364* (2013.01); *G01V 2210/32* (2013.01)

(58) Field of Classification Search
CPC ...... G01V 1/38; G01V 1/364; G01V 2210/32
USPC .......................................................... 367/24
See application file for complete search history.

(56) References Cited

U.S. PATENT DOCUMENTS

| | | | |
|---|---|---|---|
| 4,866,679 A | 9/1989 | Chambers | |
| 4,874,278 A | 10/1989 | Kawashita et al. | |
| 5,491,669 A | 2/1996 | Chambers | |
| 5,572,483 A * | 11/1996 | Chambers et al. | 367/45 |
| 5,924,049 A | 7/1999 | Beasley et al. | |
| 5,930,730 A * | 7/1999 | Marfurt et al. | 702/16 |
| 6,094,620 A * | 7/2000 | Gasparotto et al. | 702/14 |
| 6,636,810 B1 | 10/2003 | Moore et al. | |
| 6,751,559 B2 | 6/2004 | Fookes et al. | |
| 7,426,439 B2 | 9/2008 | Ozdemir et al. | |
| 7,646,672 B2 | 1/2010 | Tilman | |
| 7,817,495 B2 | 10/2010 | Özbeck et al. | |
| 8,621,113 B2 | 12/2013 | Erdmann et al. | |
| 8,949,030 B2 | 2/2015 | Ferber | |
| 9,103,942 B2 | 8/2015 | Moldoveanu et al. | |
| 2002/0138202 A1 | 9/2002 | Martinez | |
| 2005/0027454 A1 * | 2/2005 | Vaage et al. | 702/17 |

(Continued)

FOREIGN PATENT DOCUMENTS

| | | |
|---|---|---|
| GB | 2458642 A | 9/2009 |
| WO | 9820367 A1 | 5/1998 |

(Continued)

OTHER PUBLICATIONS

International Search Report and Written Opinion of PCT Application No. PCT/US2013/021135 dated May 3, 2013: pp. 1-10.

(Continued)

*Primary Examiner* — Daniel L Murphy
(74) *Attorney, Agent, or Firm* — Abimbola Bukoye

(57) ABSTRACT

A technique includes receiving data corresponding to at least one measurement of energy produced by a shot of an energy source; and transforming the received data to a domain that is sensitive to event direction. The technique includes comparing the measurement(s) with a reference based at least in part on the transformation; and based at least in part on the comparison, attenuating noise from the measurement(s).

21 Claims, 13 Drawing Sheets

(56) References Cited

U.S. PATENT DOCUMENTS

| | | |
|---|---|---|
| 2005/0180262 A1* | 8/2005 | Robinson .................. 367/47 |
| 2009/0168600 A1 | 7/2009 | Moore et al. |
| 2009/0171588 A1 | 7/2009 | Beasley |
| 2010/0097885 A1 | 4/2010 | Moore |
| 2010/0172209 A1 | 7/2010 | Meller et al. |
| 2010/0186950 A1 | 7/2010 | Neelamani et al. |
| 2010/0211320 A1 | 8/2010 | Vassallo et al. |
| 2010/0211322 A1 | 8/2010 | Vassallo et al. |
| 2010/0211323 A1 | 8/2010 | Ozdemir et al. |
| 2010/0274492 A1 | 10/2010 | Rentsch et al. |
| 2011/0002192 A1 | 1/2011 | Özbeck et al. |
| 2011/0096625 A1 | 4/2011 | Rentsch et al. |
| 2011/0276274 A1 | 11/2011 | Yu |
| 2015/0066374 A1 | 3/2015 | Ji et al. |

FOREIGN PATENT DOCUMENTS

| | | |
|---|---|---|
| WO | 0129580 A1 | 4/2001 |
| WO | 2009131619 A2 | 10/2009 |

OTHER PUBLICATIONS

Stanton et al., "Multicomponent seismic data reconstruction using the quaternion Fourier transform and POCS," SEG Annual Meeting, 2011: pp. 1267-1272.

Kragh et al., "Seismic Repeatability, Normalized RMS and Predictability," SEG Int'l Exposition and Annual Meeting, Sep. 2001: pp. 1-4.

Search Report issued in related EP application 13735886.7 on Jan. 4, 2016, 4 pages.

Aidi, et al., "Seismic signal denoising method based on curvelet tansform", Aug. 8, 2010, Natural Computation, Sixth International Conference, pp. 3624-3627.

Lianyu, et al., "Curvelet Transform and its Application in Seismic Data Denoising", Jul. 25, 2009, International Conference on Information Technology and Computer Science, pp. 369-399.

EP application 13735886.7. Article 94(3) Communication dated Jan. 25, 2016, 7 pages.

Ell, "Quaternion-Fourier transforms for analysis of two-dimensional linear time-invariant partial-differential systems", Dec. 15-17, 1993, Proceedings of the 32nd IEEE Conference on Decision and Control, vol. 2, pp. 1830-1841.

* cited by examiner

ATTENUATING NOISE ACQUIRED IN AN ENERGY MEASUREMENT

This application claims the benefit of U.S. Provisional Patent Application Serial No. 61/585921 filed Jan. 12, 2012, which is hereby incorporated by reference in its entirety.

BACKGROUND

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensor, both hydrophones and geophones, and/or other suitable sensor types. A typical measurement acquired by a sensor contains desired signal content (a measured pressure or particle motion, for example) and an unwanted content (or "noise").

SUMMARY

The summary is provided to introduce a selection of concepts that are further described below in the detailed description. This summary is not intended to identify key or essential features of the claimed subject matter, nor is it intended to be used as an aid in limiting the scope of the claimed subject matter.

In one implementation, a technique includes receiving data corresponding to at least one measurement of energy produced by a shot of an energy source; and transforming the received data to a domain that is sensitive to event direction. The technique includes comparing the measurement(s) with a reference based at least in part on the transformation; and based at least in part on the comparison, attenuating noise from the measurement(s).

In another implementation, a technique includes receiving data corresponding to at least one measurement acquired by at least one seismic sensor of a least one shot of a seismic source; and transforming the received data to a domain that is sensitive to event direction. The technique includes comparing the measurement(s) with a reference based at least in part on the transformation; and based at least in part on the comparison, attenuating noise from the measurement(s).

In yet another implementation, a system includes an interface to receive data corresponding to at least one measurement of a shot produced by an energy source and a processor-based machine to process the received data. The machine transforms the received data to a domain that is sensitive to direction; compares the measurement(s) with a reference; and based at least in part on the comparison, attenuates noise from the measurement(s).

In alternative or further implementations, the domain has a dimension of at least three.

In alternative or further implementations, the domain is selected from the group consisting of a time-inline slowness-crossline slowness domain; a frequency-inline wavenumber-crossline wavenumber domain; a frequency-inline space-crossline space domain; and a three-dimensional curvelet domain.

In alternative or further implementations, the measurement(s) is one of a plurality of measurements of energy produced by a plurality of shots, and the comparison includes determining a shot-to-shot coherence.

In alternative or further implementations, the attenuation of the noise from the measurement(s) includes filtering to remove content that corresponds to the noise or interpolating a signal that corresponds to the energy produced by the shot of the energy source.

In alternative or further implementations, the technique includes reverse transforming a result of the filtering to a domain that corresponds to a domain of the received data.

In alternative or further implementations, the attenuation of the noise from the measurement(s) includes modeling the noise; transforming the modeled noise into a domain corresponding to a domain of the received data; and removing the noise based at least in part on the transformed modeled noise.

In alternative or further implementations, the technique further includes de-aliasing the received data.

In alternative or further implementations, the technique further includes transforming the received data into at least one additional domain that is sensitive to event direction, and the comparison is further based at least in part on the transformation into the at least one additional domain.

In alternative or further implementations, the processing includes receiving seismic data acquired in a survey of a subsurface geologic region.

In alternative or further implementations, the seismic source(s) is a plurality of seismic sources, the technique includes performing source separation using the attenuation of the noise.

Advantages and other features will become apparent from the following drawings, description and claims.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description herein is for the purpose of describing particular embodiments only and is not intended to be limiting of the invention. As used in the description and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Figure 1:
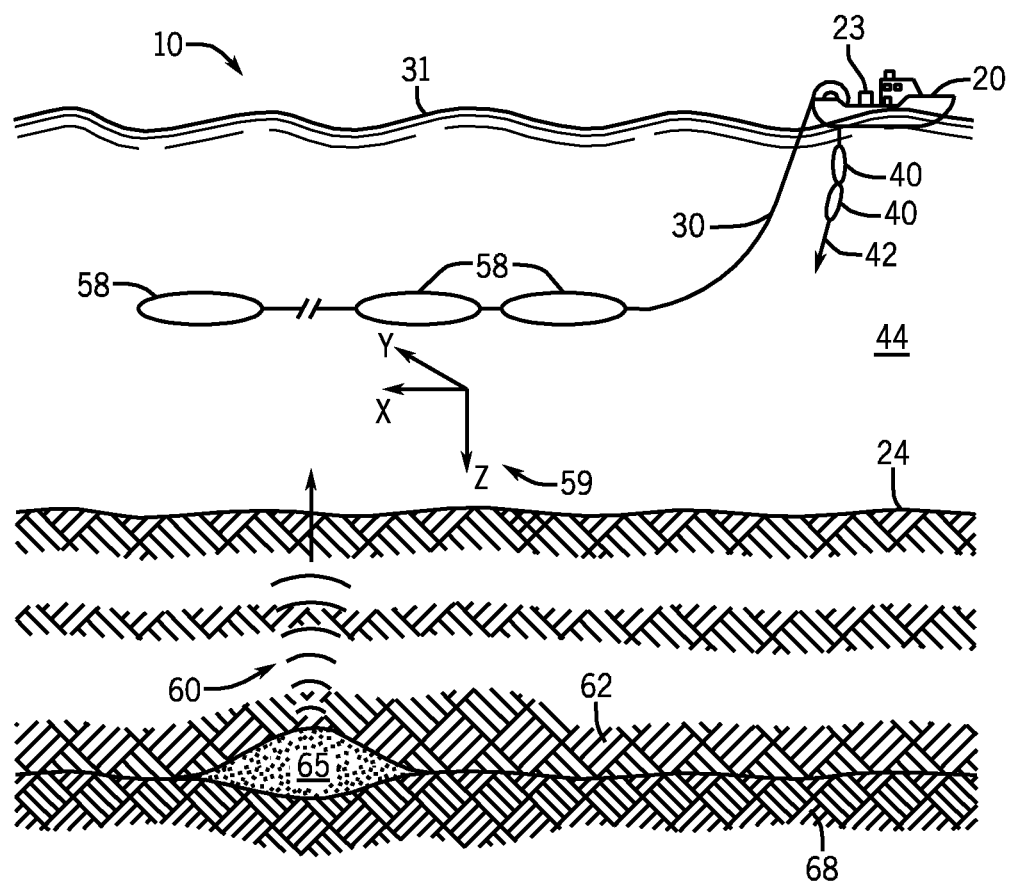
FIG. 1 is a schematic diagram of a seismic acquisition system according to an example implementation.

FIG. 1 depicts a marine-based seismic data acquisition system 10 in accordance with example implementations. In the system 10, a survey vessel 20 tows one or more seismic streamers 30 (one exemplary streamer 30 being depicted in FIG. 1) behind the vessel 20. It is noted that the streamers 30 may be arranged in an array, or spread, in which multiple streamers 30 are towed in approximately the same plane at the same depth. As another non-limiting example, the streamers may be towed at multiple depths, such as in an over/under spread, for example. Moreover, the streamers 30 of the spread may be towed in a coil acquisition configuration and/or at varying depths or slants, depending on the particular implementation.

The streamer 30 may be several thousand meters long and may contain various support cables (not shown), as well as wiring and/or circuitry (not shown) that may be used to support communication along the streamer 30. In general, the streamer 30 includes a primary cable into which is mounted seismic sensors that record seismic signals. In accordance with example implementations, the streamer 30 contains seismic sensor units 58, each of which contains a multi-component sensor. The multi-component sensor includes a hydrophone and particle motion sensors, in accordance with some embodiments of the invention. Thus, each sensor unit 58 is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular implementation, the multi-component sensor may include one or more hydrophones, geophones, particle displacement sensors, particle velocity sensors, accelerometers, pressure gradient sensors or combinations thereof As a more specific example, in accordance with some implementations, a particular multi-component sensor may include a hydrophone for measuring pressure and three orthogonally-aligned accelerometers to measure three corresponding orthogonal components of particle velocity and/or acceleration near the sensor. It is noted that the multi-component sensor may be implemented as a single device (as depicted in FIG. 1) or may be implemented as a plurality of devices, depending on the particular embodiment of the invention. A particular multi-component sensor may also include pressure gradient sensors, which constitute another type of particle motion sensors. Each pressure gradient sensor measures the change in the pressure wavefield at a particular point with respect to a particular direction.

In addition to the streamers 30 and the survey vessel 20, marine seismic data acquisition system 10 includes at least one seismic source 40, such as the two exemplary seismic sources 40 that are depicted in FIG. 1, such as air guns and the like. In some implementations, the seismic sources 40 may be coupled to, or towed by, the survey vessel 20. Alternatively, in other implementations, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the seismic sources 40 produce corresponding reflected acoustic signals, or pressure waves 60, which are sensed by the seismic sensors of the streamer(s) 30. It is noted that the pressure waves that are received and sensed by the seismic sensors include "up going" pressure waves that propagate to the sensors without reflection, as well as "down going" pressure waves that are produced by reflections of the pressure waves 60 from an air-water boundary, or free surface 31.

The seismic sensors of the streamers 30 generate signals (digital signals, for example), called "traces," which form the acquired measurements of the pressure wavefield and particle motion. The traces are recorded as seismic data and may be at least partially processed by a signal processing unit 23 that is deployed on the survey vessel 20, in accordance with some implementations. For example, a particular multi-component sensor may provide a trace, which corresponds to a measure of a pressure wavefield by its hydrophone; and the sensor may provide (depending on the particular embodiment of the invention) one or more traces that correspond to one or more components of particle motion.

A goal of the seismic acquisition may be to build up an image of a survey area for purposes of identifying subterranean geological formations, such as the exemplary geological formation 65. Subsequent analysis of the representation may reveal probable locations of hydrocarbon deposits in subterranean geological formations. Moreover, the seismic data may be processed to determine an elastic model and identify formation properties, fluid properties and the lithology of the formation. Depending on the particular implementation, portions of the analysis of the seismic data may be processed by a local data processing system on the seismic survey vessel 20 (such as by the signal processing unit 23) or may be processed by a remote seismic data processing system that may be, for example, located on land or on the vessel 20. Thus, many variations are possible and are within the scope of the appended claims.

A given seismic sensor may acquire a measurement that contains content that corresponds to a measurement of pressure and/or particle motion due to the firing of a seismic source 40 and other unwanted content (herein referred to as "noise"). As non-limiting examples, this noise may be attributable to energy that is emitted by a source in another, nearby survey; biological noise; environmental noise; earthquake interference; thunder and lightning; vehicle noise; and so forth. Systems and techniques are disclosed herein for purposes of distinguishing desired sensor content (content that corresponds to geophysical exploration responses attributable to the energy produced by the seismic sources 40, for example) from unwanted sensor content, or noise, so that a measurement containing the desired signal content and noise may be processed to attenuate (remove or suppress, as examples) the noise. It is noted that, as discussed further herein, when applied to source separation, the desired sensor content may be content attributable to a given seismic source 40; and the noise may include, for this application, content that is attributable to one or more of the other seismic sources 40.

In accordance with example implementations, techniques and systems are disclosed herein, which discriminate desired signal content from noise by processing shot gather data in a manner that separates incoherent from coherent content. In this manner, in the shot gather domain, desired signal content is coherent with respect to a reference source (one or more previous shots by the same source or a reference source); and the noise, in general, is incoherent with respect to the reference source. More specifically, the incoherency/coherency of shot gather data is determined by transforming the shot gather data into a domain that is sensitive to event direction. With a known source timing, the event direction changes relatively slowly from shot to shot. In contrast, the timing of noise is, in general, inconsistent with the source timing, and as such, the direction of the noise changes relatively rapidly from shot to shot.

Figure 2:
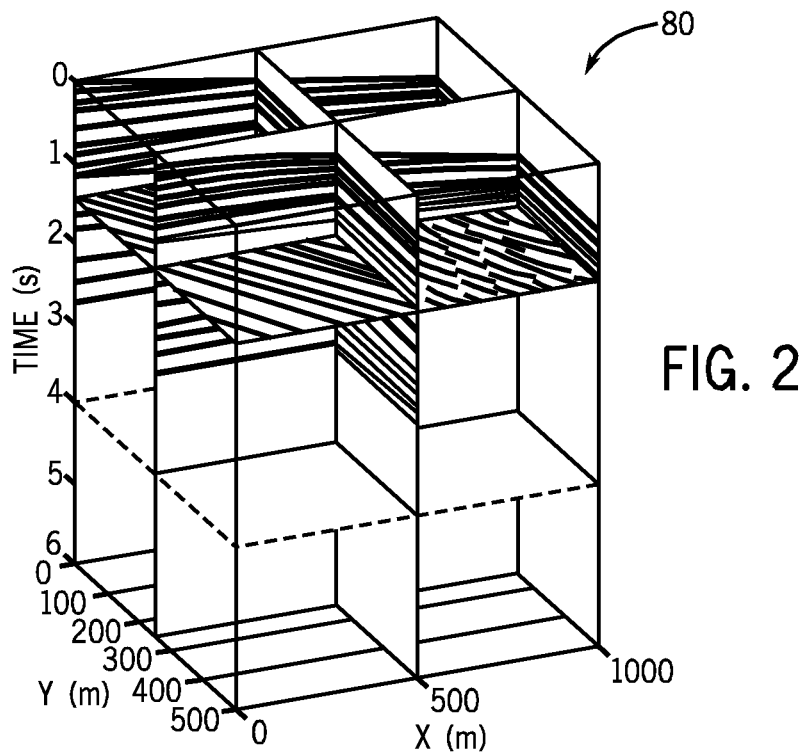
FIGS. 2 and 4 are illustrations of shot gather data corresponding to successive shot numbers according to example implementations.
Figure 3:
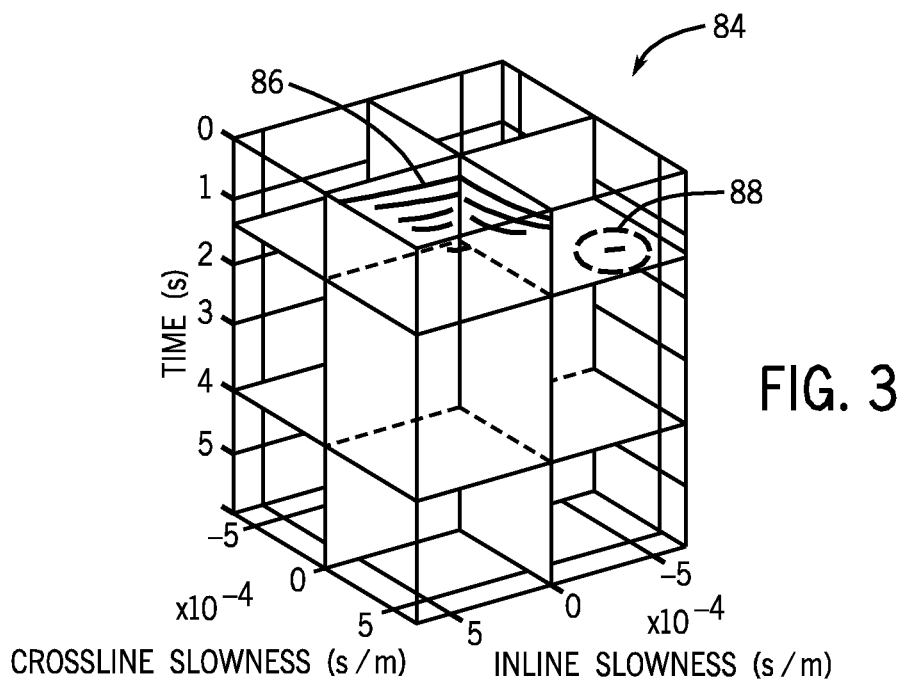
FIG. 3 is an illustration of the shot gather data of FIG. 2 after being transformed to a time-inline slowness-crossline slowness domain according to an example implementation.
Figure 4:
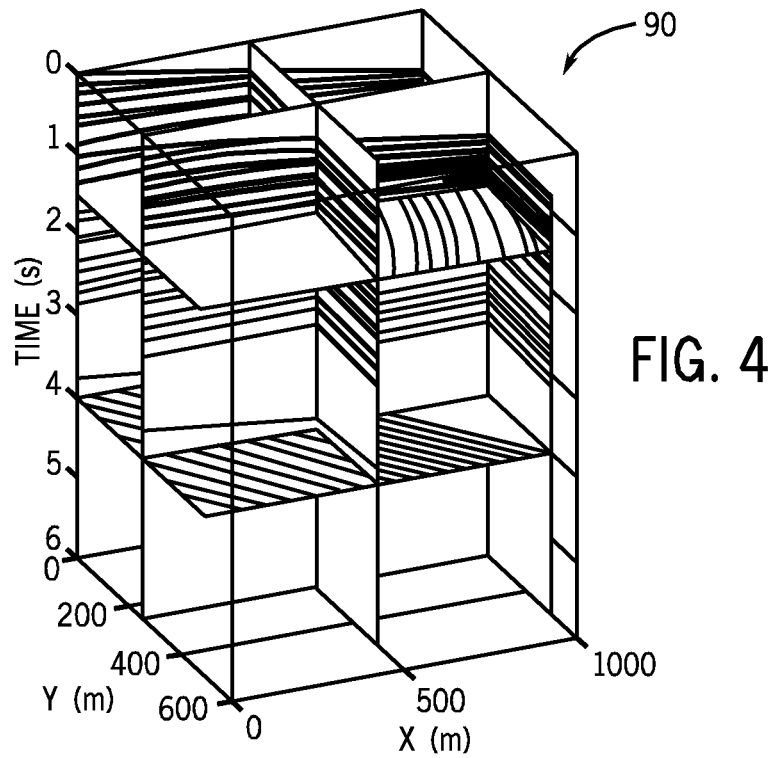
Figure 5:
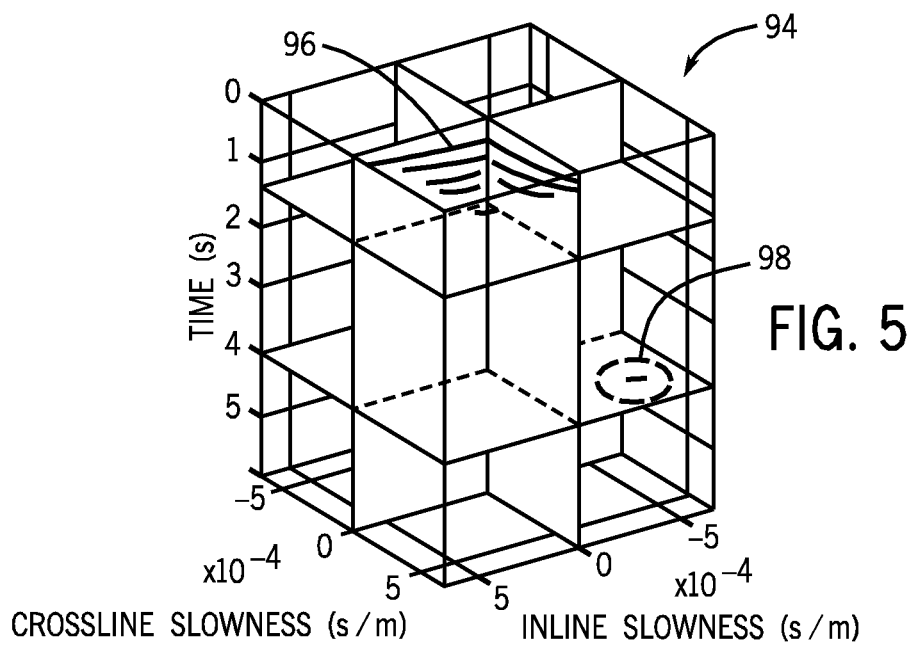
FIG. 5 is an illustration of the shot gather data of FIG. 4 after being transformed to a time-inline slowness-crossline slowness domain according to an example implementation.

As an example, FIG. 2 illustrates example three-dimensional (3-D) shot gather data 80 in the 3-D time-inline slowness-crossline slowness domain at a certain shot number. FIG. 3 depicts a transformation of the shot gather data 80 into a 3-D domain (hereinafter called a "3-D directionality exploring domain"), which permits exploration of the direction of the shot-to-shot content. For the transformed shot data 84 of FIG. 3, coherent content 86 and incoherent content, or noise 88, are illustrated. FIG. 4 depicts an example shot gather data 90 for the next successive shot. For a corresponding transformation into the time-inline slowness-crossline slowness domain, which is illustrated by data 94 of FIG. 5, the coherent content 96 appears, in general, in the same space as the coherent content 86 of FIG. 3. However, incoherent content 98, or noise, in FIG. 5 appears in a different location than the incoherent content 88 of FIG. 3. Due to the different in locations, the incoherent content may be readily identified and removed, as further disclosed below.

Figure 6:
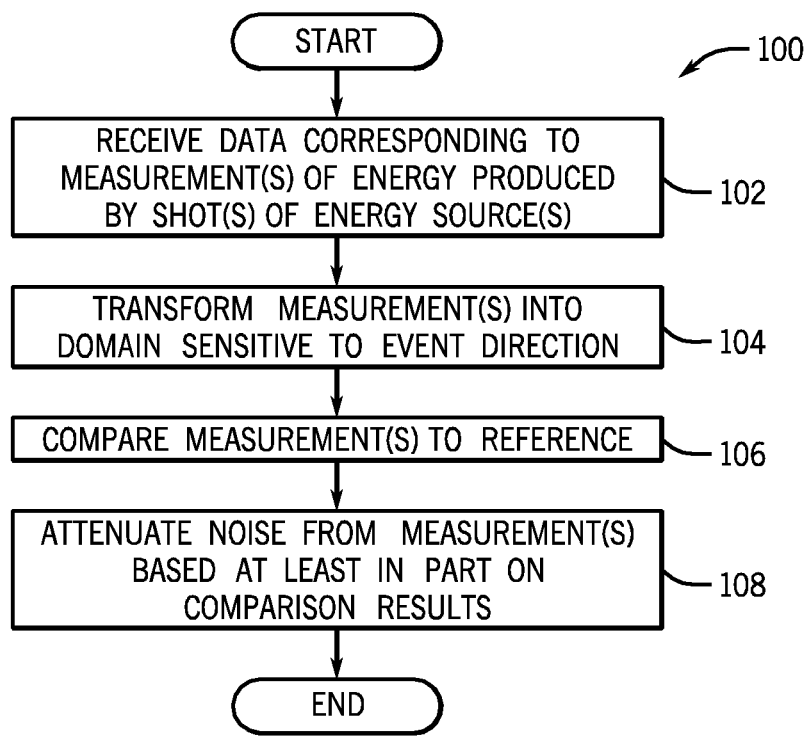
FIGS. 6, 7, 8, 9, 10 and 11 are flow diagrams depicting techniques to remove noise from energy measurements according to example implementations.

Thus, referring to FIG. 6, in accordance with example implementations, a technique 100 to attenuate (remove or suppress, as examples) noise present in an energy measurement includes receiving (block 102) data corresponding to one or more measurements of energy produced by one or more shots of one or more energy sources and transforming (block 104) the measurement(s) into a domain that is sensitive to event direction. The transformed measurement(s) aid in distinguishing incoherent from coherent content so that the transformed measurement(s) may be compared (block 106) to attenuate the noise (e.g., remove or suppress the incoherent content or reconstruct a desired signal absent the noise), pursuant to block 108.

As a more specific example, in accordance with example implementations, the measurements are acquired by seismic sensors in a seismic survey of a subsurface geologic region of interest. These measurements may be acquired by pressure sensors, particle motion sensors and/or a combination of such sensors. In general, the measurements are processed to form shot gathers, where a given shot gather refers to the measurements acquired due to a particular firing, or shot, of a given seismic source 40. The shot gather data is transformed into a 3-D directionality exploring domain, which permits exploration of the direction of the shot-to-shot content. In general, noise is more likely to map away from a desired signal in the 3-D directionality exploring domain. The mapping of the noise away from the desired signal content in the 3-D directionality exploring domain, in turn, enhances the identification and attenuation (removal or suppression) of the noise.

Figure 7:
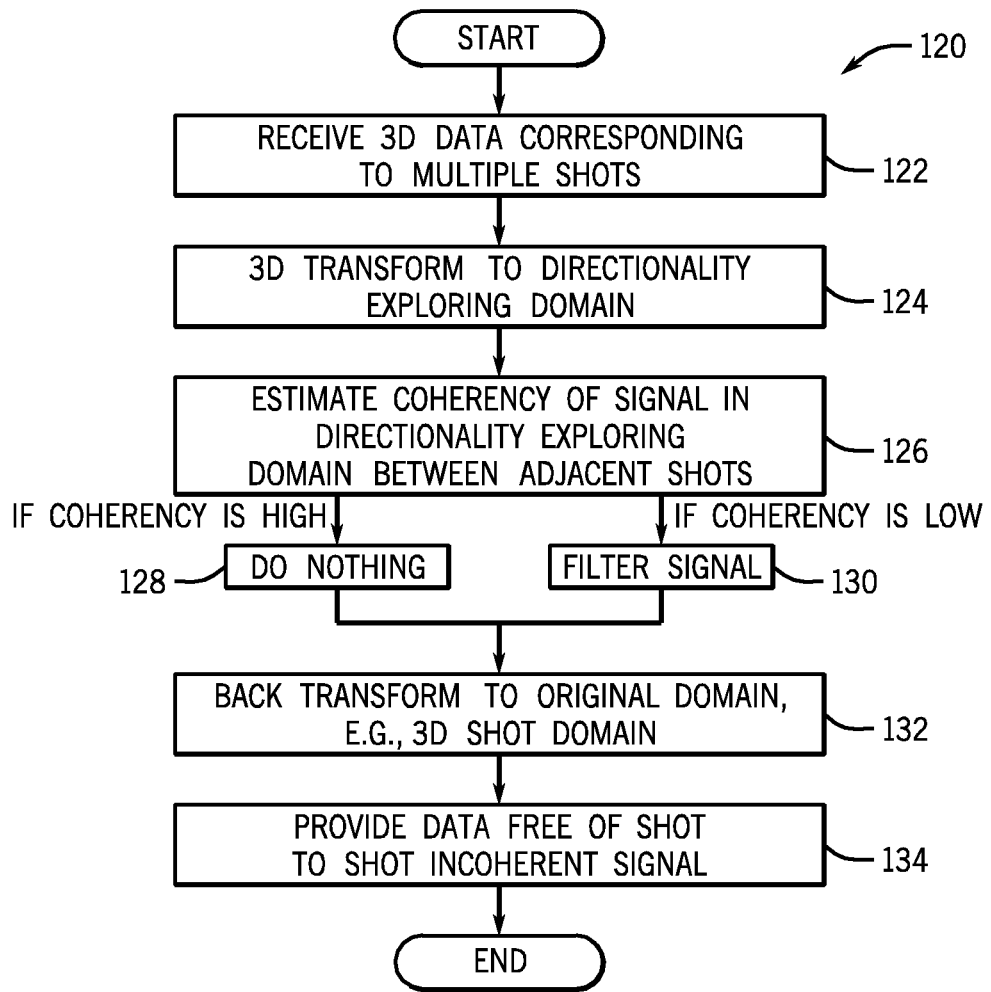

Referring to FIG. 7, thus, in accordance with example implementations, a technique 120 includes receiving (block 122) 3-D shot gather data (data in an inline space-crossline space-time domain, for example) and transforming (block 124) the data into a 3-D directionality exploring domain. The 3-D directionality exploring domain is used to estimate (block 126) the coherency of the shot to shot data. In accordance with some implementations, no further operation is performed (block 128) pertaining to the attenuation of the noise, if the determined coherency of all of the content in the transformed data is relatively high (exceeds a predetermined coherency level, for example). Otherwise, if the coherency is relatively low (block 130), such as the coherency is below the predetermined level, then the transformed data is filtered, pursuant to block 130, for purposes of removing the identified noise content. After the above-described processing, the transformed data is reversed, or back, transformed, pursuant to block 132 into the domain of the original 3-D shot gather data to provide (block 134) data that is relatively free of noise.

In accordance with some example implementations, the transformed data may be processed to provide a model of the noise, i.e., a model of a shot-to-shot incoherent signal. In this regard, referring to FIG. 8, in accordance with example implementations, a technique 150 including performing blocks 122, 124, 126 and 130, similar to the corresponding blocks of FIG. 7, for purposes of transforming 3-D shot gather data into a 3-D directionality exploring domain. Before the process data is back transformed (block 154) to the original 3-D shot domain, however, the noise content (if any) is subtracted, pursuant to block 152, to build a model of the shotto-shot incoherent signal. After the back transformation (block 154), the modeled noise signal is then subtracted (block 158), either directly or adaptively, to provide (block 160) data free of the shot-to-shot incoherent signal. It is noted that the back transformation of the noise also provides (block 156) the model of the shot-to-shot incoherent signal in the domain of the original shot gather data.

The seismic sensors may not acquire non-aliased content due to undersampling in one or more directions. In this manner, in certain survey geometries, such as, for example, geometry in which multiple streamers are generally towed at different crossline positions, the acquired seismic data may be subject to relatively significant aliasing in the crossline direction, as the spatial sampling in the crossline direction may not satisfy the Nyquist spatial sampling rate. Therefore, in accordance with example implementations, the acquired seismic data may be first de-aliased before the noise attenuation processing. The de-aliasing may involve using one or more reconstruction techniques to add constructed samples to the data along the undersampled direction (the crossline direction, for example). It is noted that the de-aliasing may reconstruct samples along a direction other than the crossline direction (reconstruct samples in the inline direction, for example) to remove aliasing in that direction, in accordance with other implementations.

As non-limiting examples, crossline reconstruction techniques, such as one or more of the techniques disclosed in the following references may be applied: UK Patent Application Publication No. GB 2450122, entitled, "INTERPOLATING IRREGULARLY SAMPLED SEISMIC DATA," which was filed on Jun. 13, 2007; U.S. patent application Ser. No. 12/131,870, entitled, "JOINTLY INTERPOLATING AND DEGHOSTING SEISMIC DATA," which was filed on Jun. 2, 2008; U.S. patent application Ser. No. 12/370,710, entitled, "RECONSTRUCTING A SEISMIC WAVEFIELD," which was filed on Feb. 13, 2009; U.S. patent application Ser. No. 12/370,762, entitled, "INTERPOLATING A PRESSURE WAVEFIELD IN AN UNDERSAMPLED DIRECTION," which was filed on Feb. 13, 2009; and U.S. patent application Ser. No. 12/429,288, entitled, " DETERMINING ATTRIBUTES OF SEISMIC EVENTS," which was filed on Apr. 24, 2009. Other reconstruction techniques may be applied, in accordance with further implementations. Moreover, in accordance with further implementations, the shot gather data may be transformed into a 3-D directionality exploring domain without performing reconstruction or de-aliasing.

As non-limiting examples, depending on the particular implementation, the 3-D directionality exploring domain may be selected from one of the following domains: a time-inline slowness-crossline slowness domain; a frequency-inline wavenumber-crossline wavenumber domain; a frequency-inline space and crossline space domain; and a 3-D curvelet domain. Domains other than the domains described herein, which explore 3-D directionality as well as the transforms into and out of such domains may be used, in accordance with further implementations.

As a non-limiting example, for implementations in which the shot gather data is transformed into the frequency-inline wavenumber-crossline wavenumber, 3-D directionality exploring domain, the corresponding transformation (called "$\hat{S}(\omega,k_x,k_y)$" below) may be described as follows:

$$\hat{S}(\omega,k_x,k_y)=\iiint s(t,x,y)e^{i\omega t}e^{-ik_x x}dtdxdy,\qquad \text{Eq. 1}$$

where "s (t, x, y)" represents a shot domain measurement signal to be transformed (a signal that has been reconstructed to remove aliasing effects or the original shot domain signal, if reconstruction is not used); "$\omega=2\pi f$" represents the angular frequency; "$k_x$" represents the inline wavenumber; and "$k_y$" represents the crossline wavenumber. It is noted that the 3-D transform may be performed, depending on the particular implementation, either by carrying out three, one-dimensional (1-D) transforms or by performing a 1-D transform followed by a two-dimensional (2-D) transform, in further implementations.

In further implementations, a multi-component Fourier transform may be used, such as the Fourier transforms disclosed in the article by Stanton, Aaron and Sacchi, Mauricio, entitled, "*Multicomponent Seismic Data Reconstruction Using The Quaternion Fourier Transform And POCS*," SEG Expanded Abstracts 30, 1267 (2011); and the article by Ell, .T. A., entitled, "*Quaternion-Fourier Transforms For Analysis of Two-Dimensional Linear Time-Invariant Partial-Differential Systems*," Proceedings of the 32$^{nd}$ IEEE Conference on Decision and Control, 1830-1841 (1993).

It is noted that the multi-component data may be, as non-limiting examples, measured data, reconstructed multi-component data or spatial gradients of reconstructed data (reconstructed pressure, for example). Moreover, the data may be data that may or may not contain ghost or free surface effects. Thus, many variations are contemplated, which are within the scope of the appended claims.

As an example of another transform, the linear time-inline slowness-crossline slowness transform (called "m" below) may be described as follows:

$$m(\tau,p_x,p_y)=\int dx\int s(t,x,y)dy,\qquad \text{Eq. 2}$$

where "s(t,x,y)" represents the reconstructed single component data at time t and at a horizontal location (x,y). The time t may be described as follows:

$$t=\tau+p_x x+p_y y,\qquad \text{Eq. 3}$$

where "$\tau$" represents a vertical intercept time, and "p" represents a slowness vector having inline ("$p_x$") and crossline ("$p_y$") components. It is noted that implementations other than implementations in which linear components are used, such as implementations that use parabolic or hyperbolic components, are contemplated and are within the scope of the appended claims. For implementations in which nonlinear components are used, the definition of the time t changes and is of the following form:

$$t=\tau+p\Psi(h),\qquad \text{Eq. 4}$$

where "$\Psi(h)$" defines the shaped of the integration, and "h" represents an offset. For example, for "$\Psi(h)=h^2$" the integration path is a parabola. It is noted that, in accordance with some implementations, a transform may first be performed in the inline direction and then a transform may be performed in the crossline direction, effectively conducting two 2-D transforms instead of a single 3-D transform.

It is noted that a 3-D-slowness transform and its corresponding back transform may be expressed as a sequence of direct and inverse 1-D Fourier transforms. Consequently, a time-slowness transform may be obtained from the multi-component data using, for example, the 1-D Fourier transform technique that is set forth in Stanton and Sacchi (2011).

As yet another example of a transformation technique, in further implementations, single or multi-component data may be used directly to transform the 3-D data into the 3-D directionality exploring domain. For example, in accordance with some implementations, an irregular crossline sampling may be used to overcome certain crossline aliasing of the single or multi-component data. It is noted that the time-slowness transforms may perform some degree of de-aliasing, as described in, for example, U.S. Pat. No. 6,636,810, entitled, "HIGH-RESOLUTION RADON TRANSFORM FOR PROCESSING SEISMIC DATA," which issued on Oct. 21, 2003.

For purposes of attenuating (removing or suppressing, as examples) the noise identified in the 3-D directionality exploring domain, the transformed data is filtered by one or more single or multiple-dimension filters. For example, in accordance with some implementations, a 1-D filter that compares the coherency of one sample in the 3-D directionality exploring domain over one or more adjacent shots may be used. In an example implementation, the amplitude level may be used as a basis (the sole basis, for example) for discriminating noise. In this manner, if the amplitude level is consistent within a predefined range (a range of ±10%, for example) over one or more adjacent shots, then the corresponding signal content is regarded as coherent and else regarded as incoherent, or noise.

In further implementations, a 2-D filter may be constructed to compare the coherency of a number of samples (several time samples, several inline or crossline slowness samples, several frequency samples and so forth) over one or more adjacent shots. In general, techniques for identifying and suppressing signals in the time or frequency domain are disclosed in, for example, U.S. Pat. No. 4,866,679, entitled, "METHOD FOR IDENTIFYING ANOMALOUS NOISE AMPLITUDES IN SEISMIC DATA," which issued on Sep. 12, 1989; and U.S. Pat. No. 5,491,669, entitled "METHOD FOR IDENTIFYING AND SUPPRESSING ANOMALOUS FREQUENCY COMPONENTS IN SEISMIC DATA," which issued on Feb. 13, 1996.

In further implementations, the root mean square (RMS) amplitude of the 1-D series (several time samples at a common inline slowness and common crossline slowness, for example) may be compared over one or more adjacent shots and compared with a predefined threshold $\xi$ (a threshold $\xi$ of ±10%) to determine whether the signal content is noise or desired signal content. For example, a binary coherency flag C may be defined as follows:

$$C = \begin{cases} 1 & |RMS_1 - RMS_2| \leq \xi \cdot RMS_1 \\ 0 & |RMS_1 - RMS_2| > \xi \cdot RMS_1, \end{cases} \quad \text{Eq. 5}$$

where "RMS" is defined as follows:

$$RMS = \sqrt{\frac{\sum_{n=1}^{N} F(n)^2}{N}}, \quad \text{Eq. 6}$$

and "F(n)" represents a 1-D subset of the data in a 3-D directionality exploring domain (for example, the time direction $\tau_n$ in $m(\tau_n, p_x, p_y)$ from Eq. 1). If more than two shots are compared, the binary coherency flag C may be determined from the deviation of the median RMS of all considered shots, as set forth below:

$$C = \begin{cases} 1 & |RMS_1 - \text{median}(RMS)| \leq \xi \cdot \text{median}(RMS) \\ 0 & |RMS_1 - \text{median}(RMS)| > \xi \cdot \text{median}(RMS). \end{cases} \quad \text{Eq. 7}$$

In further implementations, properties other than RMS values may be considered. For example, entries of the amplitude spectrum of the 1-D series between one or more successive shots may be compared.

Alternatively, in further implementations, correlation values (cross-correlation coefficients, for example) or predictability values between the 1-D series may be determined, and a threshold may be used to discriminate noise from desired signal content. The predictability values are disclosed in further detail in the article by Kragh, Ed and Christie, Phil entitled, "*Seismic Repeatability, Normalized RMS and Predictability*," The Leading Edge (2002). The use of a series has a particular advantage in that the strength of the relation between two or more series may be obtained, where the possible consistency between the two series is not limited to simultaneous values but may include leading, lagged or smoothed relationships. Other techniques may be used for purposes of detecting the noise, in accordance with other implementations.

For implementations in which a 3-D filter is employed to attenuate the noise, the 3-D filter may be constructed to compare the coherency of a number of samples in two directions of the 3-D directionality exploring domain. For example, the 3-D filter may compare the coherency of several time samples and several inline or crossline slowness samples, several frequency and several inline or crossline wavenumber samples, and so forth, over one or more adjacent shots.

A four-dimensional (4-D) filter may be employed to compare the coherency of a number of samples in all three directions of the 3-D directionality exploring domain over one or more adjacent shots. In general, for filters of n dimensions, the dimension of the series used to obtain the coherency measure may be n−1.

Figure 9:
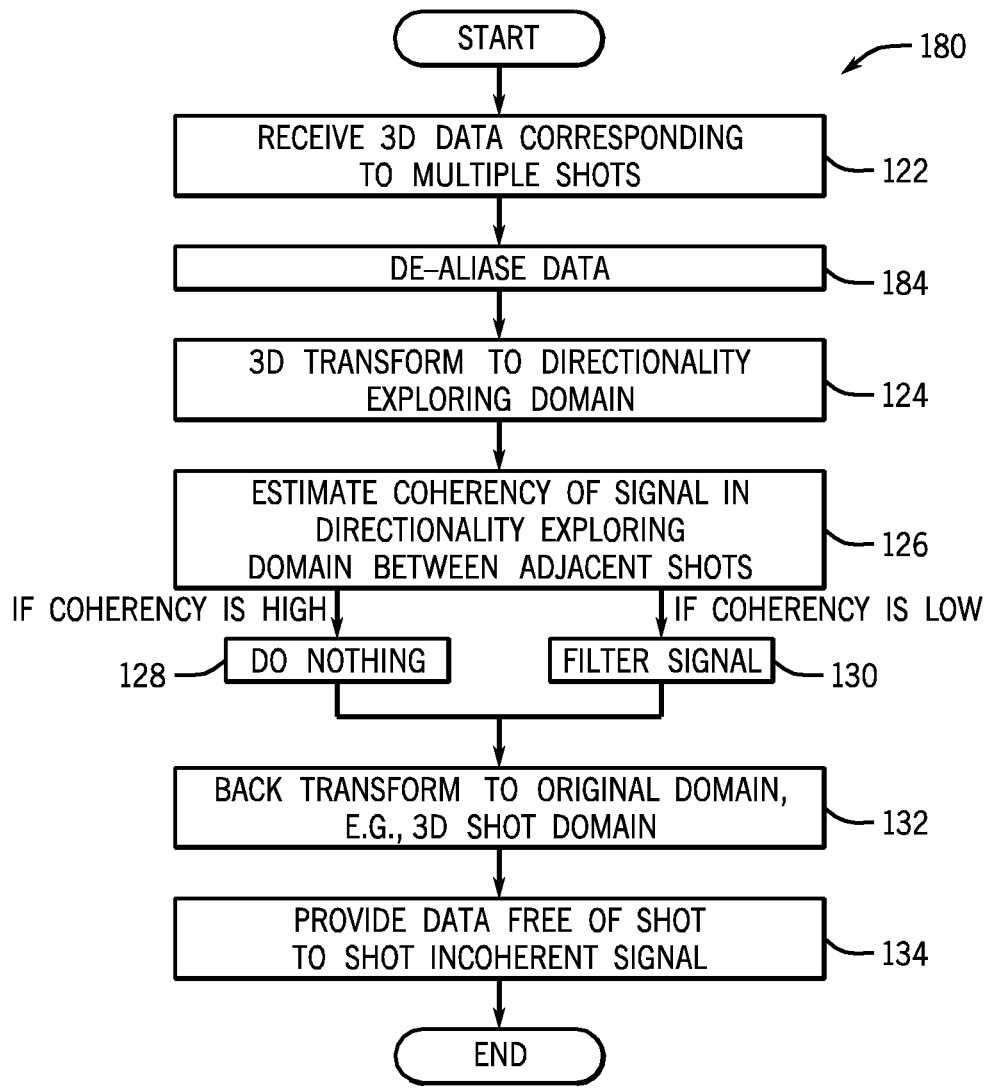

Thus, to summarize, in accordance with some implementations, a technique 180 that is depicted in FIG. 9 may be used for purposes of removing noise from energy measurements. Pursuant to the technique 150, shot gather data corresponding to multiple shots is received, pursuant to block 122 and de-aliased, pursuant to block 184. The de-aliased data is then transformed into a 3-D directionality exploring domain, pursuant to block 124; and in this domain, a coherency of the signal between adjacent shots is estimated, pursuant to block 126. If the coherency is relatively high, no further processing may occur. Otherwise, if the coherency is relatively low, the signal in the 3-D directionality exploring domain may be filtered, pursuant to block 130. The processed signal is back transformed, pursuant to block 132, to the original domain to provide (block 134) data that is relatively free of any shot-to-shot incoherent signal.

Figure 8:
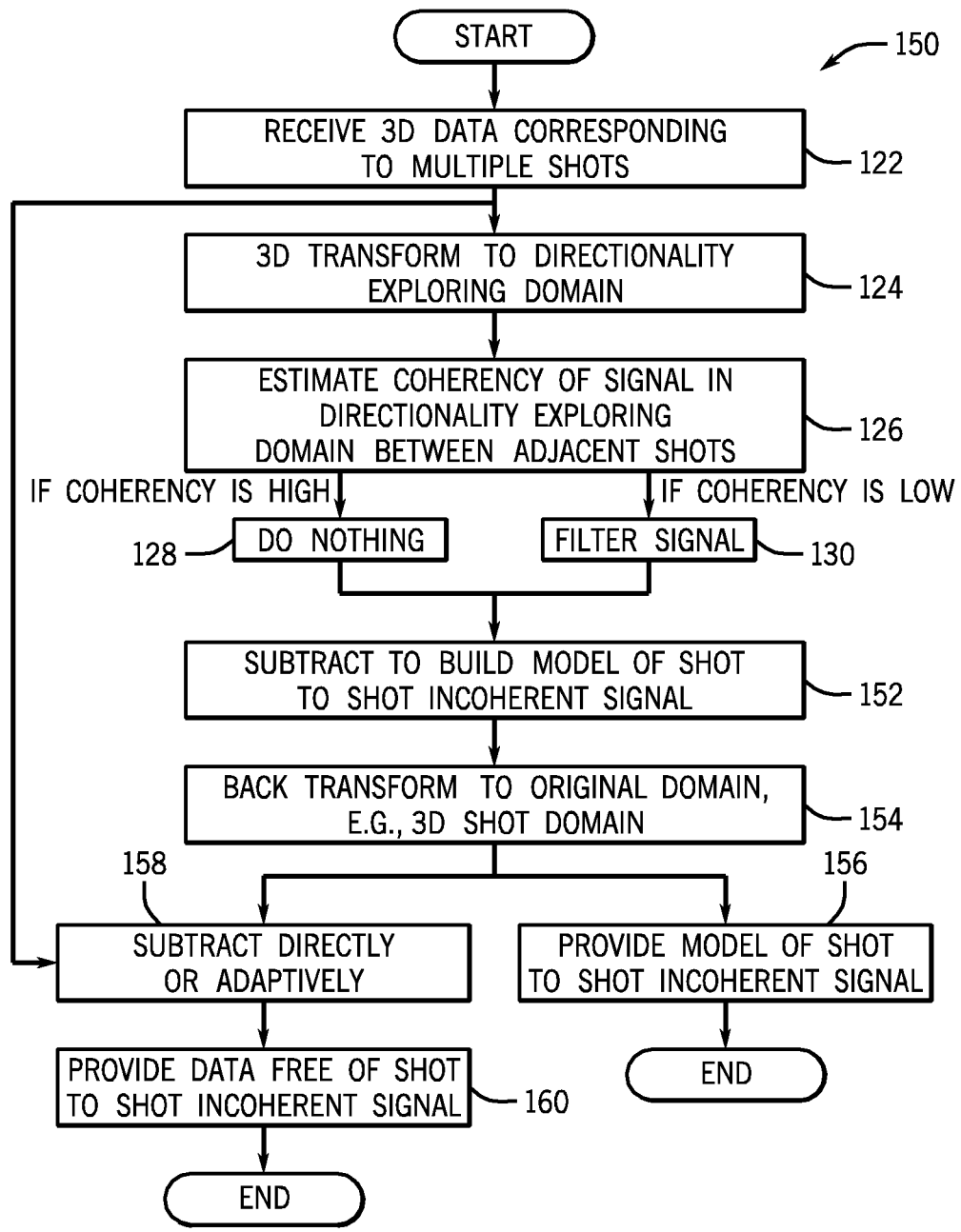
Figure 10:
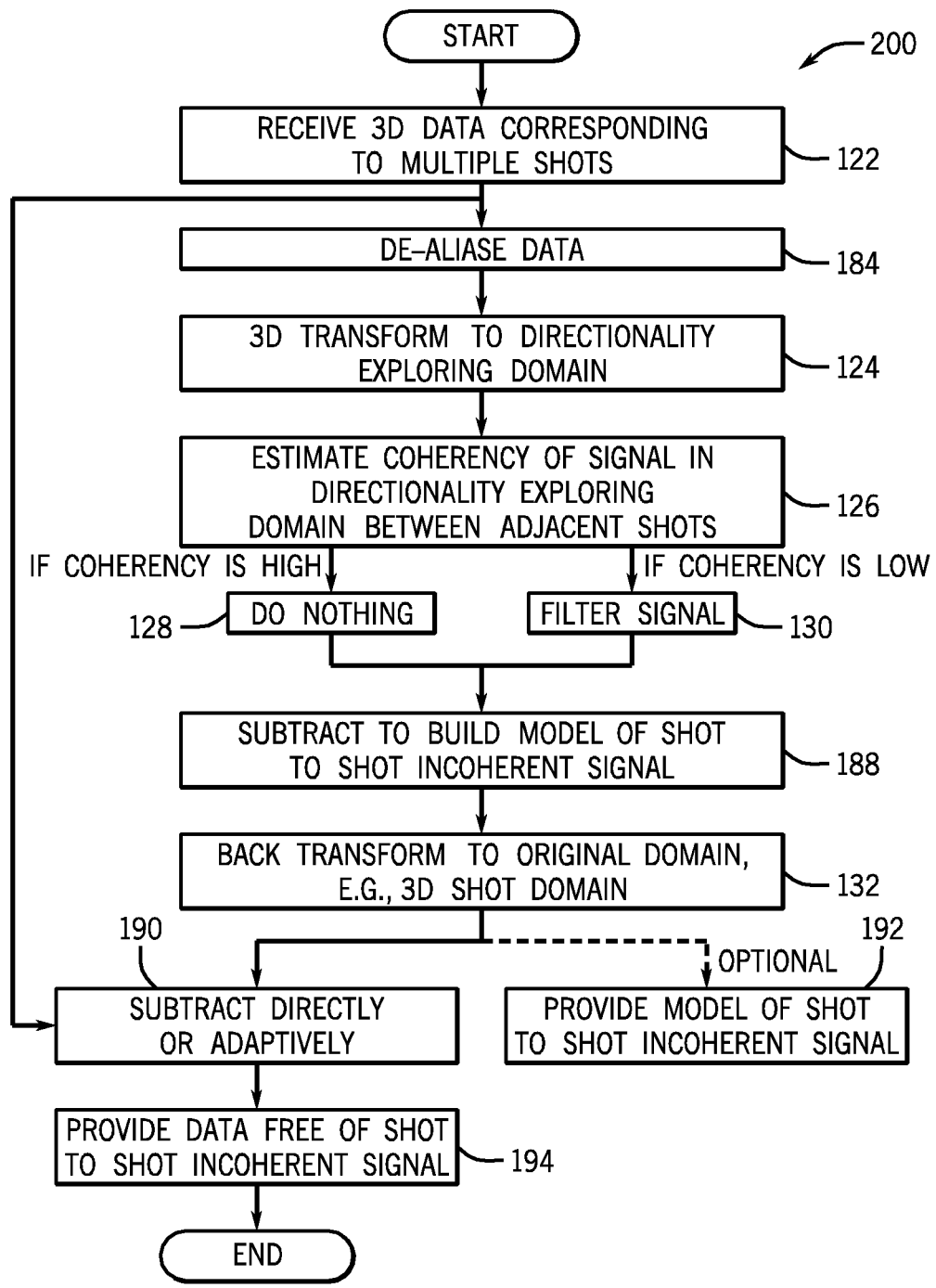

The de-aliasing may also be applied to the technique 150 of FIG. 8 in which a model of the shot-to-shot incoherent signal may be provided. More specifically, referring to FIG. 10, in accordance with some implementations, a technique 200 includes receiving (block 122) shot gather data, which corresponds to multiple shots and de-aliasing the data, pursuant to block 184. After the de-aliasing, the data may then be transformed to a 3-D directionality exploring domain, pursuant to block 124.

In the 3-D directionality exploring domain, the coherency of the signal is estimated, pursuant to block 126, between adjacent shots. If the coherency is relatively high, no further processing may be performed; otherwise, if the coherency is relatively low, then the signal may be filtered, pursuant to block 130. Pursuant to the technique 200, the filtered signal is then subtracted from the original signal (block 188) to build a model of the shot-to-shot incoherent signal; and then the modeled signal is back-transformed, pursuant to block 132 to provide (block 192) a model of the shot-to-shot incoherent signal. This signal may be subtracted (block 190) directly or adaptively to provide (block 194) data that is relatively free of any shot-to-shot incoherent signal.

Exploring the 3-D directionality of the shot domain data may be advantageous over, for example, 2-D processing methods, as the unwanted noise may be more likely to map away from the wanted signal in the 3-D directionality exploring domains, especially if the unwanted noise is radiated from some crossline offset. The separation of the noise from the desired signal, in turn, enhances the identification and removal of the noise and also protects the desired signal content.

Figure 12:
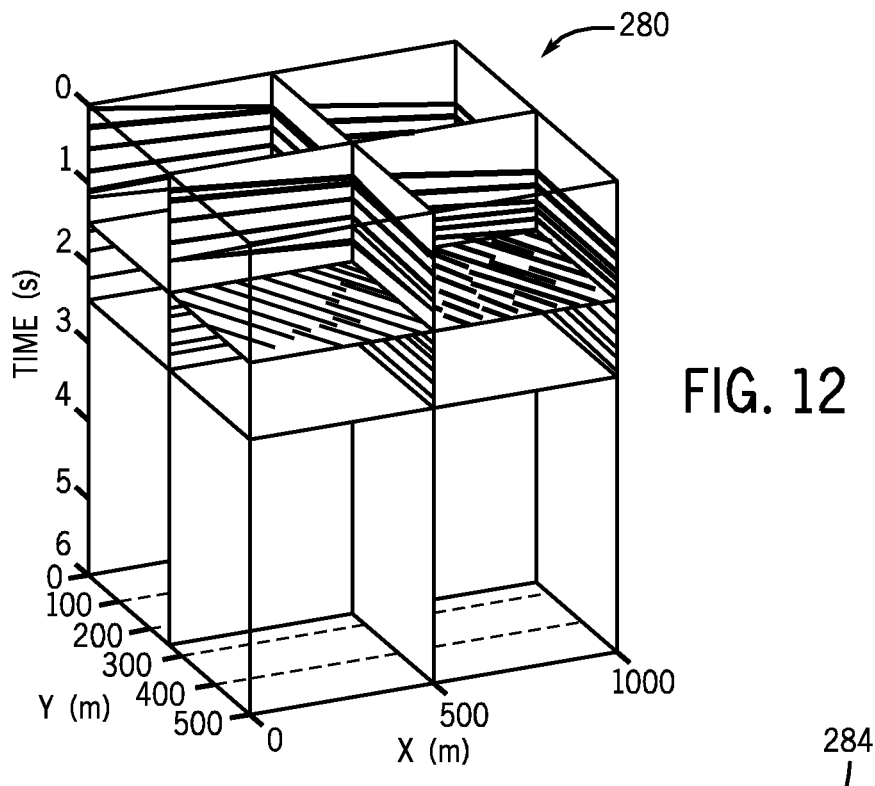
FIG. 12 is an illustration of shot gather data in an inline space-crossline space-time domain according to an example implementation.
Figure 13:
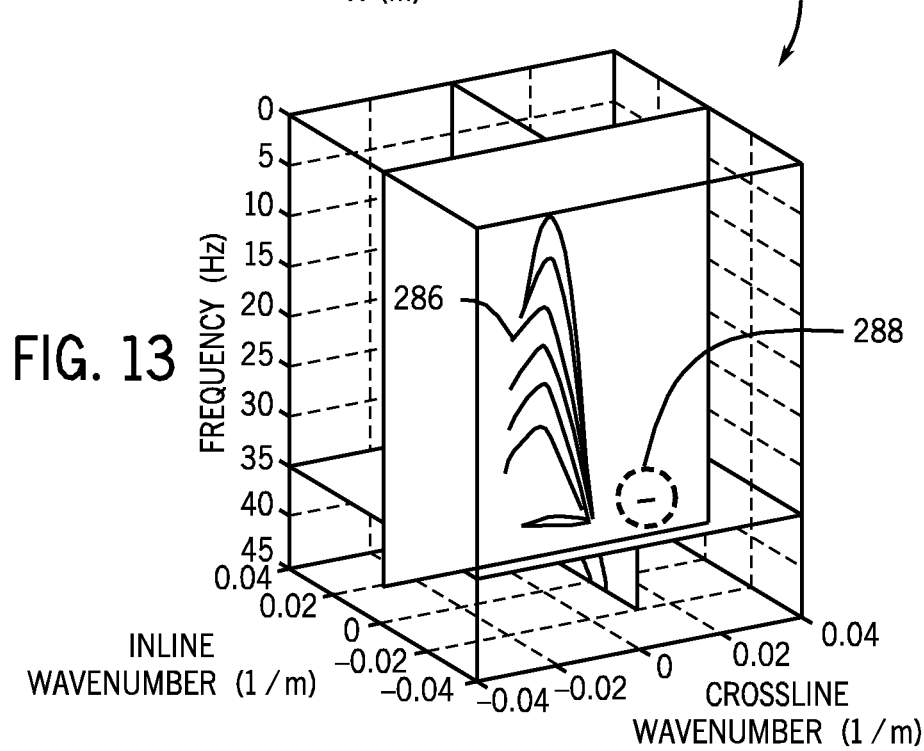
FIG. 13 is an illustration of the shot gather data of FIG. 12 after being transformed to a frequency-inline wavenumber-crossline wavenumber domain according to an example implementation.

As a more specific example, FIG. 12 depicts an illustration 280 of 3-D shot gather data. In this regard, the illustration 280 depicts the shot gather data in a crossline (Y)-inline (X)-time domain. Referring also to FIG. 13 in conjunction with FIG. 8, a transformation may be applied to the shot gather data of FIG. 12 to transform the data into the frequency-inline wavenumber-crossline wavenumber domain, a 3-D directionality exploring domain, as depicted in an illustration 284. For this illustration, noise 288 maps away from desired signal content 286 in this 3-D directionality exploring domain.

Figures 14A, 14B:
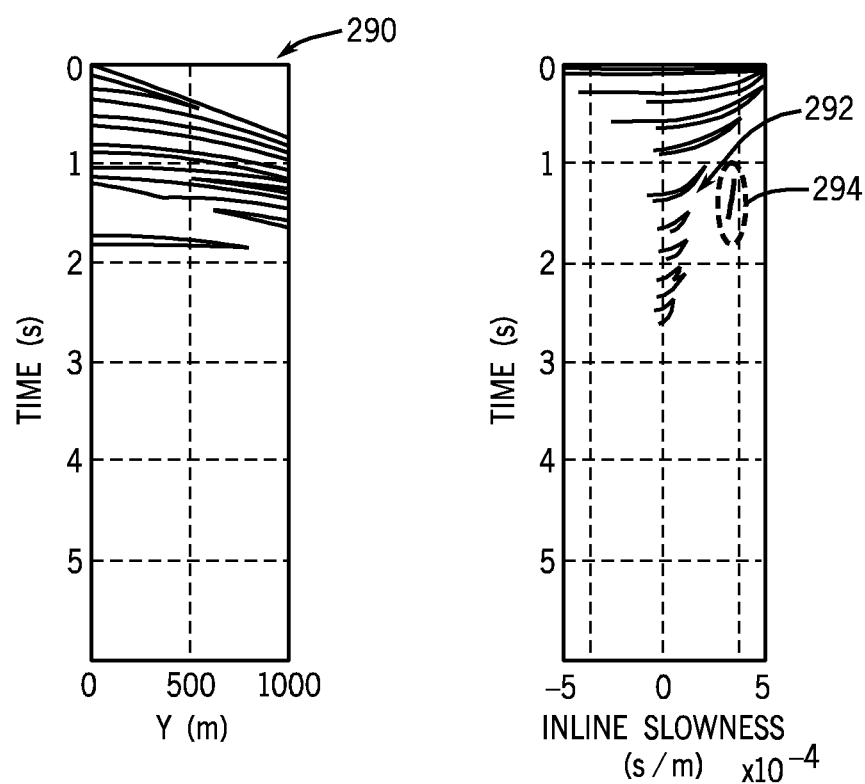
FIG. 14A is an illustration of shot gather data in a crossline space-time domain according to an example implementation.
FIG. 14B is an illustration of the shot gather data of FIG. 14A after being transformed to a time-slowness domain according to an example implementation.
Figure 15:
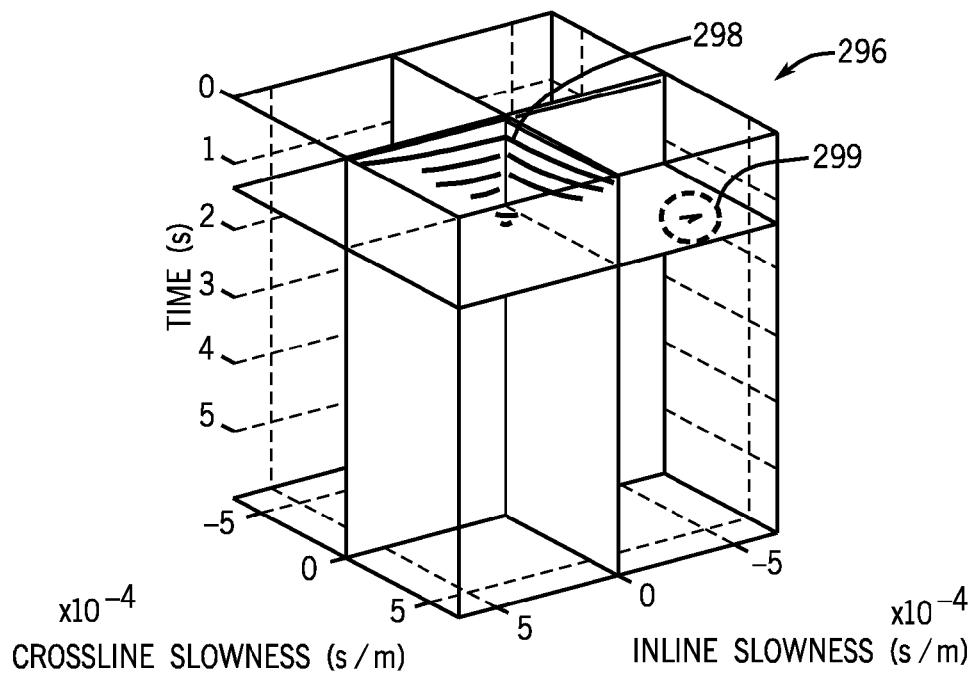
FIG. 15 is an illustration of the shot gather data of FIG. 14A after being transformed to a time-inline slowness-crossline slowness domain according to an example implementation.

As another example, FIG. 14A depicts an illustration 290 of 2-D shot gather data, and FIG. 10B depicts an illustration 291 of the shot gather data after being transformed in a 2-D time-slowness domain. As can be seen in the transform 291 of FIG. 14B, desired signal content 292 is relatively close to noise content 294. However, if the shot data of FIG. 14A is instead transformed to a 3-D directionality exploring domain, as depicted in an illustration 296 of FIG. 15, then separation of the noise from the desired signal content is enhanced.

More specifically, illustration 296 is in the time-inline slowness-crossline slowness domain and illustrates noise 299, which is separate from desired signal content 298. The separation exceeds the separation in the 2-D domain of FIG. 14B, due to the ability to explore 3-D signal directionality.

Figure 11:
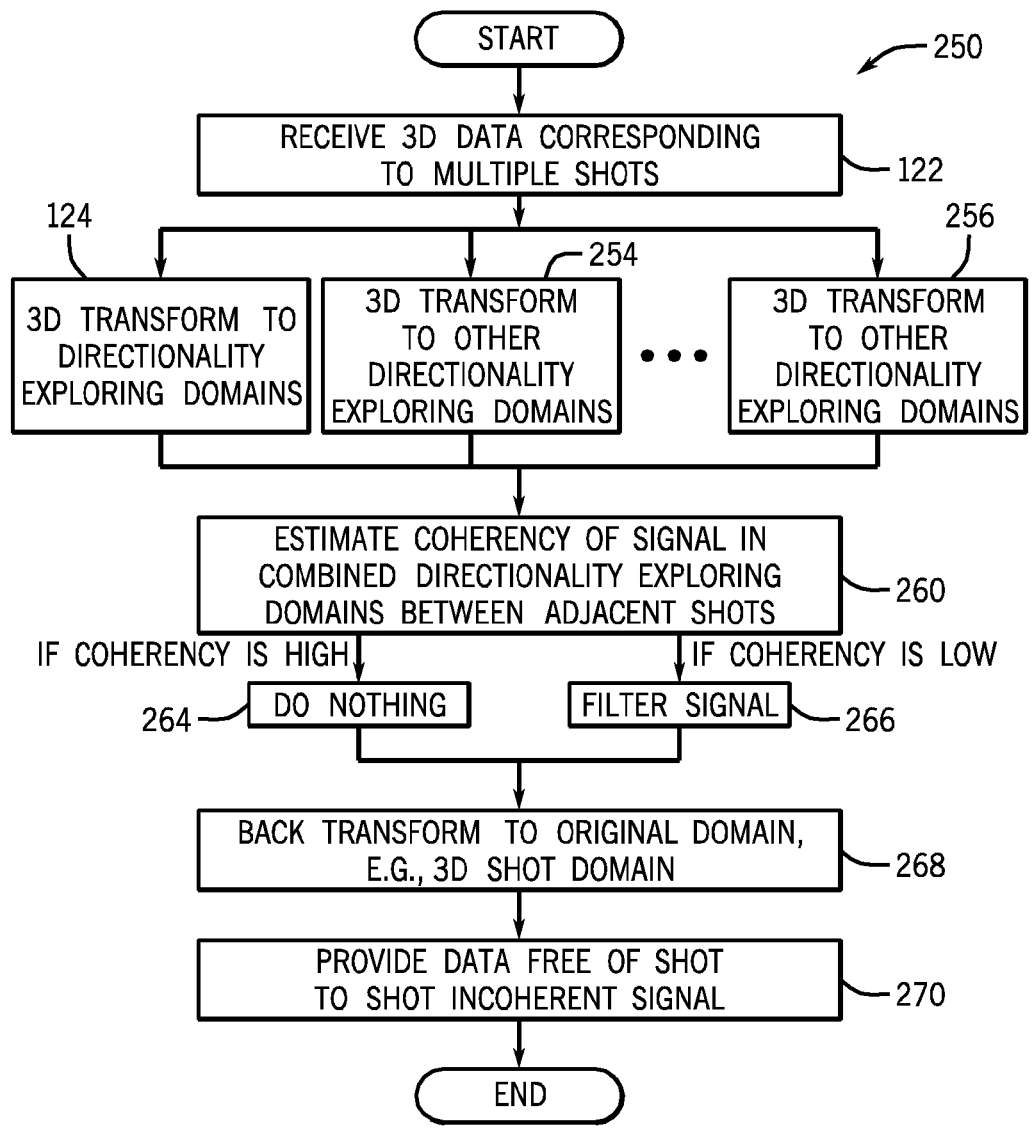

Other variations are contemplated and are within the scope of the appended claims. For example, in accordance with further implementations, multiple 3-D directionality exploring domain transformations may be used. In this regard, referring to FIG. 11, in accordance with further implementations, a technique 250 includes receiving (block 122) 3-D shot gather data corresponding to multiple shots, performing (block 124) a transformation to the 3-D directionality exploring domain and performing other transforms to other 3-D directionality exploring domains, such as illustrated by blocks 254 and 256. As non-limiting examples, these other 3-D directionality exploring domains may be a time-inline slowness-crossline slowness domain, a frequency-inline wavenumber-crossline wavenumber domain, and so forth. The coherency of the signal may then be estimated in the combination of the above-described domains, pursuant to block 260. In this regard, if the coherency is relatively high, then further processing may not be employed; but, if the coherency is relatively low, then the signal may be filtered, pursuant to block 266. The processed data is then back-transformed, pursuant to block 268, to provide (block 270) data that is relatively free of any shot-to-shot incoherent signal.

Thus, filter dimensions higher than 4-D may be employed for purposes of combining more than one 3-D directionality exploring domain. In accordance with some implementations, a binary mask (a mask having values of ones and zeros, for example) may be applied to separate/filter a directional signal that is coherent in one or more adjacent shots from signal to signal that is considered abnormal due to not being coherent in one or more adjacent shots. Smoothing of the mask may be applied to softly taper out the unwanted signal, which may be relatively beneficial to avoid challenges, such as the Gibbs phenomenon, for example, in the back transformation or further processing.

Figure 16:
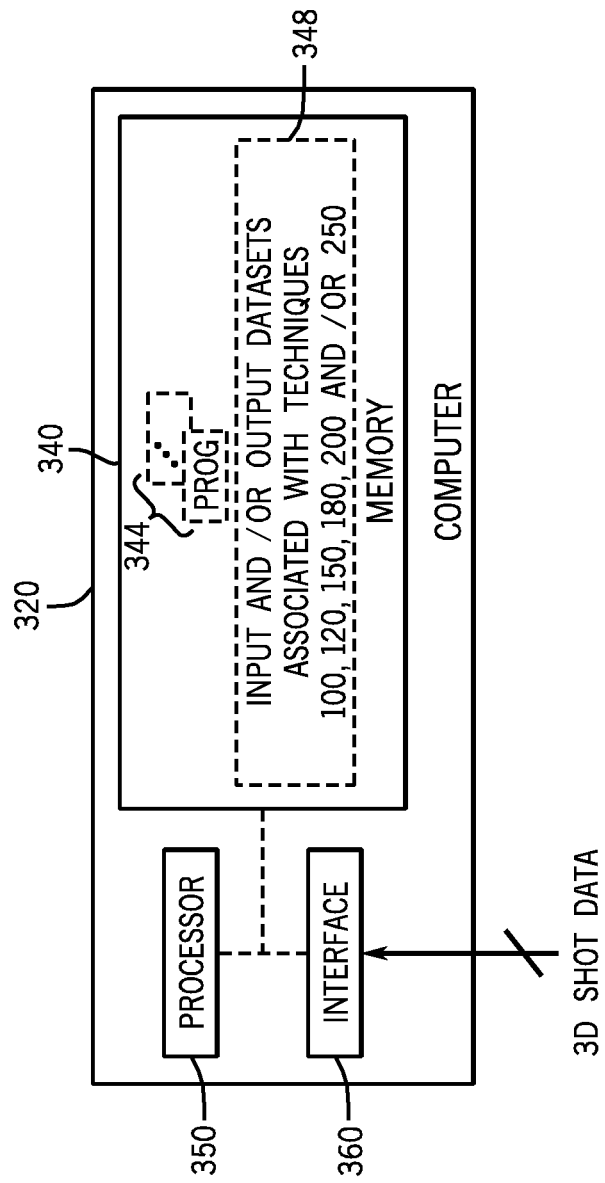
FIG. 16 is a schematic diagram of a data processing system according to an example implementation.

Referring to FIG. 16, in accordance with some implementations, a machine, such as a data processing system 320, may contain a processor 350 for purposes of processing 3-D shot gather data for purposes of removing noise from the data.

In accordance with some implementations, the processor 350 may be formed from one or more microprocessors and/or microprocessor processing cores and thus, may itself be formed from multiple processors. In general, the processor 350 is a general purpose processor, and may be formed from, depending on the particular implementation, one or multiple Central Processing Units (CPUs), or application specific integrated circuits (ASICs), field programmable gate arrays (FPGAs), programmable logic devices (PLDs), or other appropriate devices, as can be appreciated by the skilled artisan. As a non-limiting example, the processor 350 may be part of the circuitry 23 on the vessel 20, or may be disposed at a remote site. Moreover, the data processing system 320 may be a distributed processing system, in accordance with further implementations.

As depicted in FIG. 16, the processor 350 may be coupled to a communication interface 360 for purposes of receiving such data as 3-D shot gather data; data requesting parameters for the 3-D directionality exploring domain and reverse 3-D directionality exploring domain transformations; data representing parameters to be used in a de-aliasing/reconstruction operation; data requesting filter parameters; and so forth. As examples, the communication interface 360 may be a Universal Serial Bus (USB) interface, a network interface, a removable media interface (a flash card, CD-ROM interface, etc.) or a magnetic storage interface (an Intelligent Device Electronics (IDE)-compliant interface or Small Computer System Interface (SCSI)-compliant interface, as non-limiting examples). Thus, the communication interface 360 may take on numerous forms, depending on the particular implementation.

In accordance with some implementations, the processor 350 is coupled to a memory 340 that stores program instructions 344, which when executed by the processor 350, may cause the processor 350 to perform various tasks of one or more of the techniques and system that are disclosed herein, such as the techniques 100, 120, 150, 180, 200 and/or 250, for example. As a non-limiting example, in accordance with some implementations, the instructions 344, when executed by the processor 350, may cause the processor 350 to receive data corresponding to one or more measurements of energy produced by one or more shots of one or more energy sources, transform the measurement(s) into a domain that is sensitive to an event direction; and remove noise from the measurement(s) based at least in part on the transformed data. The instructions 344, when executed by the processor 350 may further cause the processor 350 to perform de-aliasing; perform multiple 3-D directionality exploring domain transforms; take into account coherency/incoherency enhanced in the multiple 3-D directionality exploring domain transforms to identify noise; construct a model of a shot-to-shot interference signal; filter noise from the transformed data; display one or more determine preliminary, intermediate or final images associated with the above-described processing; and so forth.

In general, the memory 340 is a non-transitory memory and may take on numerous forms, such as (as non-limiting examples) semiconductor storage, magnetic storage, optical storage, phase change memory storage, capacitor-based storage, and so forth, depending on the particular implementation. Moreover, the memory 340 may be formed from more than one of these non-transitory memories, in accordance with further implementations. When executing one or more of the program instruction 344, the processor 350 may store preliminary, intermediate and/or final results obtained via the execution of the instructions 344 as data 348 that may be stored in the memory 340.

It is noted that the data processing system 320 is merely an example of one out of many possible architectures, in accordance with the techniques and systems that are disclosed herein. Moreover, the data processing system 320 is represented in a simplified form, as the processing system 320 may have various other components (a display to display initial, intermediate and/or final results of the system's processing, as non-limiting examples), as can be appreciated by the skilled artisan.

Other variations are contemplated, which are within the scope of the appended claims. In this regard, although FIG. 1 depicts a towed seismic survey system, the system and techniques that are disclosed herein may be applied to other types of seismic acquisition systems, such as seabed-based seismic acquisition systems, land-based seismic acquisition systems, seismic acquisition systems deployed in/in connection with a well, and so forth.

Moreover, the systems and techniques that are disclosed herein may be applied to energy measurement acquisitions systems, other than seismic acquisition systems. For example, the techniques and systems that are disclosed herein may be applied to non-seismic-based geophysical survey systems, as electromagnetic or magnetotelluric-based acquisition systems, in accordance with further implementations. The techniques and systems that are disclosed herein may also be applied to energy measurement acquisition systems, other than systems that are used to explore geologic regions. Thus, although the surveyed target structure of interest described herein is a geologic structure, the target structure may be a non-geologic structure (human tissue, a surface structure, and so forth), in accordance with other implementations.

As another example, in accordance with further implementations, a probability function of a desired signal or noise may be used at least in part to determine the coherency from shot to shot. Such a probability function may either be used directly as a weighting function replacing a binary mask or may be used to construct such a weighting function.

As another example, in accordance with further implementations, the unwanted signal may not be merely muted or downweighted, but may be reconstructed. In this manner, interpolation may be used from successive shot data to reconstruct the underlying desired signal using information from one or more adjacent shots.

In further implementations, the "noise" may be energy content from a particular source of the seismic acquisition system. In this regard, in accordance with some implementations, the seismic acquisition system may use simultaneously or near-simultaneously-fired sources, which may interfere with each other (i.e., the sensors may concurrently sense energy from more than one source). The techniques that are disclosed herein may be used for purposes of performing source separation by focusing on energy from a particular source as being the desired signal content, while regarding the energies from the interfering sources as being noise. The techniques and systems that are disclosed herein may be used in conjunction with another source separation technique, such as the one disclosed in, for example, U.S. Patent Application Publication No. US 2009/0168600 A1, entitled, "SEPARATING SEISMIC SIGNALS PRODUCED BY INTERFERING SEISMIC SOURCES," which was published on Jul. 2, 2009.

As yet another variation, in further implementations, multi-component data may be processed using a de-aliasing domain transform, which fits pressure and its gradients simultaneously, such as a transform described in U.S. Provisional Patent App. Ser. No. 61/643087 (herein called the "'087 application"), entitled, "SEISMIC DATA PROCESSING WITH FREQUENCY DIVERSE DE-ALIASING FILTERING," which was filed on May 4, 2012. A general discussion of the transform that is disclosed in the '087 patent application follows.

The '087 application, in general, discloses methods, techniques and workflows for deghosting algorithms based at least in part on frequency diverse filtering. Frequency diverse filtering is generally disclosed in U.S. patent application Ser. No. 13/305234 (attorney docket number IS11.0742), which is herein called the "'234 patent application" and is hereby incorporated by reference in its entirety. The deghosting may be coupled to single-component or multi-component point-sensor based three-dimensional seismic data recorded by using slant cables and/or flat cables in an array of seismic streamers (in fact any shape of streamer can be considered); and the deghosting may also be applied to single-component or multi-component digital group-formed or the electronic group-formed seismic data recorded by using slant cables and/or flat cables in an array of seismic streamers.

In some embodiments related to point-sensor single-component or multi-component seismic data (data recording hydrophones plus one or more components of particle motion, velocity or acceleration), two sets of time-frequency-slowness basis functions, one with the ghost, the other without the ghost, are constructed. The set of basis functions with the ghost are used to decompose the recorded data into a slowness-time model by a one-norm($l_1$) or zero-norm($l_0$) optimization procedure. The deghosted data (i.e., the upgoing wavefield) is calculated by using the optimally (or in some embodiments, improved) decomposed slowness-time model and the set of time-frequency-slowness basis functions without ghost.

In some embodiments, for the group-formed data, the group forming operator can be included in the basis functions so that the deghosting error caused by the group forming is optimally corrected by the one-norm or zero-norm optimal decomposition procedure.

The disclosed embodiments related to deghosting can combined with the simultaneous separation algorithm described in the '234 patent application to jointly do the source separation and deghosting for the simultaneously acquired single-component or multi-component seismic data by using slanted cables and/or flat cables in an array of seismic streamers.

The disclosed embodiments related to deghosting can also be combined with the simultaneous separation algorithms, techniques and methods described in the '234 patent application and the interpolation/regularization algorithms, techniques, and methods disclosed herein to jointly do the source separation, deghosting and interpolation/regularization for the simultaneously acquired single-component or multi-component seismic data by using slanted cables and/or flat cables in an array of seismic streamers.

Attention is now directed to methods, techniques, and computing systems for deghosting collected data. A method for deghosting collected data according to some embodiments has been tested successfully on synthetic data. The disclosed embodiments work with both aliased and un-aliased data, and can be used to a) remove the receiver ghost, for example in a common shot gather; and/or b) remove the source ghost, for example in a common receiver gather.

Attention is now directed to examples of some equations and expressions that can be used to calculate, estimate, or derive various metrics in the embodiments discussed herein.

For convenience of notation, assume that we have $2M+1$ channels of recorded data, and assume that we use $2L+1$ number of frequencies. The actual number of channels and frequencies need not to be odd numbers. Defining the sensor position vector x, $x=(x,y,z)$, where x is the coordinate in the in-line direction, y is the coordinate in the cross-line direction and z is the coordinate in the vertical direction, the frequency-diverse basis function without ghost at slowness $p=(p_x,p_y,q)$ can be written as $$g(p, \tau_0) = \begin{pmatrix} g_{-L}(x_{-M}, p, \tau_0) \\ \vdots \\ g_{-L}(x_M, p, \tau_0) \\ \vdots \\ g_0(x_{-M}, p, \tau_0) \\ \vdots \\ g_0(x_M, p, \tau_0) \\ \vdots \\ g_L(x_{-M}, p, \tau_0) \\ \vdots \\ g_L(x_M, p, \tau_0) \end{pmatrix} \quad \text{Eq. 8}$$

and $$g_l(x_i, p, \tau_0) = e^{-j2\pi f_l u(p, x_i - x_0, \tau_0)} \quad \text{Eq. 8a}$$

where $P_x$ is the in-line slowness, $P_y$ is the cross-line slowness and q is the vertical slowness, $x_i, i=-M, \ldots, 0, \ldots M$, are position vectors of $2M+1$ channels of data, $f_l, l=-L, \ldots, 0, \ldots L$, are $2L+1$ frequencies, $\tau_0$ is the intercept time which represents the arrival time at sensor $x_0$ of an event with slowness p, $u(p,x_i-x_0,\tau_0)$ is called the phase function which is a function of slowness p, the relative position between sensor $x_i$ and the reference sensor $x_0$, and its arrival time ($\tau_0$) at sensor $x_0$. In one example in accordance with some embodiments, the frequencies and the positions are spread around a central frequency or position. The actual frequencies or positions need not to be arranged in a symmetric fashion, however; any arrangement is acceptable for the methods described here.

The phase function $u(p,x_i-x_0,\tau_0)$ in the basis functions defined as in Eq. 8a can be linear, thereby modeling linear events, and it can be written as $$u(p, x_i - x_0, \tau_0) = p_x(x_i - x_0) + p_y(y_i - y_0) + q(z_i - z_0) + \tau_0, \quad \text{Eq. 9}$$

and $$q = \sqrt{1/v_w^2 - p_x^2 - p_y^2}, \quad \text{Eq. 10}$$

where $v_w$ is the propagation velocity of sound in water. The phase function $u(p,x_1-x_0,\tau_0)$ can also be any other type of function, such as hyperbolic, which can be written as $$u(p, x_i - x_0, \tau_0) = \sqrt{p_x^2(x_i - x_0)^2 + p_y^2(y_i - y_0)^2 + q^2(z_i - z_0) + \tau_0^2} \quad \text{Eq. 11}$$

or a combination of different types of functions.

The frequency-diverse basis function with ghost at slowness p for modeling the recorded data can be written as $$g^{gh}(p, \tau_0) = \begin{pmatrix} g_{-L}^{gh}(x_{-M}, p, \tau_0) \\ \vdots \\ g_{-L}^{gh}(x_M, p, \tau_0) \\ \vdots \\ g_0^{gh}(x_{-M}, p, \tau_0) \\ \vdots \\ g_0^{gh}(x_M, p, \tau_0) \\ \vdots \\ g_L^{gh}(x_{-M}, p, \tau_0) \\ \vdots \\ g_L^{gh}(x_M, p, \tau_0) \end{pmatrix} \quad \text{Eq. 12}$$

and $$g_l^{gh}(x_i, p, \tau_0) = (1 + re^{-j2\pi f_l q z_{-M}}) e^{-j2\pi f_l u(p, x_{-M} - x_0, \tau_0)}, \quad \text{Eq. 12a}$$

where r is the reflection coefficient at sea surface. The $2M+1$ channels and $2L+1$ number of frequencies of recorded data, d, can be written in vector form as $$d = \begin{pmatrix} d(f_{-L}, x_{-M}) \\ \vdots \\ d(f_{-L}, x_M) \\ \vdots \\ d(f_0, x_{-M}) \\ \vdots \\ d(f_0, x_M) \\ \vdots \\ d(f_L, x_{-M}) \\ \vdots \\ d(f_L, x_M) \end{pmatrix}. \quad \text{Eq. 13}$$

In some embodiments, one would next define and discretize the slowness into $N_p$ slownesses, from $p_{min}$ to $p_{max}$, and define and discretize the intercept time $\tau_0$ into $N_{\tau_0}$ times, from $\tau_0^{min}$ to $\tau_0^{max}$. The resulting model m is written as $$m = \begin{pmatrix} m(p_1, \tau_0^1) \\ \vdots \\ m(p_1, \tau_0^{N_{\tau_0}}) \\ \vdots \\ m(p_{N_p}, \tau_0^1) \\ \vdots \\ m(p_{N_p}, \tau_0^{N_{\tau_0}}) \end{pmatrix}. \quad \text{Eq. 14}$$

The decomposition problem can be written as $$\min\|m\|_1 \text{ or } \min\|m\|_0 \text{ subject to } \|Am-d\|_2 \le \epsilon, \quad \text{Eq. 15}$$

$$A = (g^{gh}(p_1, \tau_0^1) \ldots g^{gh}(p_1, \tau_0^{N_{\tau_0}}) \ldots g^{gh}(p_{N_p}, \tau_0^{N_{\tau_0}})), \quad \text{Eq. 16}$$

and ε is the noise of the data. In some embodiments, the deghosted data can then be computed by $$d^{deghosted} = Bm \quad \text{Eq. 17}$$

where $$d^{deghosted} = \begin{pmatrix} d^{deghosted}(f_0, x_{-M}) \\ \vdots \\ d^{deghosted}(f_0, x_M) \end{pmatrix} \quad \text{Eq. 18}$$

and $$B = \left( g(p_1, \tau_0^1) \ \ldots \ g(p_1, \tau_0^{N_{\tau_0}}) \ \ldots \ g(p_{N_p}, \tau_0^{N_{\tau_0}}) \right) \quad \text{Eq. 19}$$

In some implementations, a flow of deghosting the data may proceed as follows.

1. Transform the data into frequency-space domain.
2. Set the reference frequency $f_0$ to the first frequency of the data and select its adjacent frequencies.
3. Compute the multi-frequency basis functions defined by Eqs. 8 and 12.
4. Construct matrix A in Eq. 16.
5. Solve the optimization problem m defined by Eq. 15.
6. Compute the deghosted data $d^{deghosted}$, by using Eq. 17.
7. Repeat from 3 to 7 until all frequencies have been processed.
8. Transform the interpolated data back to time-space domain.

In some embodiments, such as those involving group-formed data, a group forming operator can be included in the basis function defined in Eqs. 8 and 12, which can be written as $$g_{gf}(p, \tau_0) = \begin{pmatrix} grf(g_{-L}(x_{-M}, p, \tau_0), g_{-L}(x_{-M}^1, p, \tau_0), \ldots, g_{-L}(x_{-M}^K, p, \tau_0)) \\ \vdots \\ grf(g_{-L}(x_M, p, \tau_0), g_{-L}(x_M^1, p, \tau_0), \ldots, g_{-L}(x_M^K, p, \tau_0)) \\ \vdots \\ grf(g_0(x_{-M}, p, \tau_0), g_0(x_{-M}^1, p, \tau_0), \ldots, g_0(x_{-M}^K, p, \tau_0)) \\ \vdots \\ grf(g_0(x_M, p, \tau_0), g_0(x_M^1, p, \tau_0), \ldots, g_0(x_M^K, p, \tau_0)) \\ \vdots \\ grf(g_L(x_{-M}, p, \tau_0), g_L(x_{-M}^1, p, \tau_0), \ldots, g_L(x_{-M}^K, p, \tau_0)) \\ \vdots \\ grf(g_L(x_M, p, \tau_0), g_L(x_M^1, p, \tau_0), \ldots, g_L(x_M^K, p, \tau_0)) \end{pmatrix} \quad \text{Eq. 20}$$

and $$g_{gf}^{gh}(p, \tau_0) = \begin{pmatrix} grf(g_{-L}^{gh}(x_{-M}, p, \tau_0), g_{-L}^{gh}(x_{-M}^1, p, \tau_0), \ldots, g_{-L}^{gh}(x_{-M}^K, p, \tau_0)) \\ \vdots \\ grf(g_{-L}^{gh}(x_M, p, \tau_0), g_{-L}^{gh}(x_M^1, p, \tau_0), \ldots, g_{-L}^{gh}(x_M^K, p, \tau_0)) \\ \vdots \\ grf(g_0^{gh}(x_{-M}, p, \tau_0), g_0^{gh}(x_{-M}^1, p, \tau_0), \ldots, g_0^{gh}(x_{-M}^K, p, \tau_0)) \\ \vdots \\ grf(g_0^{gh}(x_M, p, \tau_0), g_0^{gh}(x_M^1, p, \tau_0), \ldots, g_0^{gh}(x_M^K, p, \tau_0)) \\ \vdots \\ grf(g_L^{gh}(x_{-M}, p, \tau_0), g_L^{gh}(x_{-M}^1, p, \tau_0), \ldots, g_L^{gh}(x_{-M}^K, p, \tau_0)) \\ \vdots \\ grf(g_L^{gh}(x_M, p, \tau_0), g_L^{gh}(x_M^1, p, \tau_0), \ldots, g_L^{gh}(x_M^K, p, \tau_0)) \end{pmatrix} \quad \text{Eq. 21}$$

where $x_i$, $i=-M, \ldots, M$ is the location of the output of the group forming, sensors at $x_i^k$, $k=1, \ldots, K$ are sensors used in the group forming at $x_i$, and grf is the operator of group forming.

As set forth in the '234 patent application, the collected data may be interpolated and/or regularized as follows, in accordance with example implementations.

Suppose that we wish to output interpolated data at locations, $Y_0, \ldots, y_{N-1}$. For convenience of notation, assume that we have 2M+1 input channels of recorded data, and assume that we use 2L+1 number of frequencies. The actual number of channels and frequencies need not to be odd numbers. The frequency-diverse array response or basis function at slowness $p=(p_x, p_y, q)$ for modeling the seismic data can be written as $$g(x, p, \tau_0) = \begin{pmatrix} g_{-L}(x_{-M}, p, \tau_0) \\ \vdots \\ g_{-L}(x_M, p, \tau_0) \\ \vdots \\ g_0(x_{-M}, p, \tau_0) \\ \vdots \\ g_0(x_M, p, \tau_0) \\ \vdots \\ g_L(x_{-M}, p, \tau_0) \\ \vdots \\ g_L(x_M, p, \tau_0) \end{pmatrix}, \quad \text{Eq. 22}$$

and $$g_l(x_i, p, \tau_0) = e^{-j2\pi f_l u(p, x_i - x_0, \tau_0)}, \quad \text{Eq. 22a}$$

where $p_x$ is the in-line slowness, $p_y$ is the cross-line slowness and q is the vertical slowness, $x_i, i=-M, \ldots, 0, \ldots M$, are position vectors of 2M+1 channels of data, $f_l, l=-L, \ldots, 0, \ldots L$, are 2L+1 frequencies, $\tau_0$ is the intercept time which represents the arrival time at sensor $x_0$ of an event with slowness p, $u(p, x_i-x_0, \tau_0)$ is called the phase function which is a function of slowness p, the relative position between sensor $x_i$ and the reference sensor $x_0$, and its arrival time ($\tau_0$) of the event at reference sensor $x_0$. The frequencies and the positions are spread around a central frequency or position. The actual frequencies or positions need not to be arranged in a symmetric fashion. Any arrangement is acceptable for the methods described here.

The function $u(p,x_i-x_0,\tau_0)$ in the basis functions defined as in Eq. 22a can be linear, thereby modeling linear events, and it can be written as $$u(p,x_i-x_0,\tau_0)=p\cdot(x_i-x_0)+\tau_0 \qquad \text{Eq. 23}$$

or any other type of function, such as hyperbolic, which can be written as $$u(p,x_i-x_0,\tau_0)=\sqrt{p^2\cdot(x_i-x_0)^2+\tau_0^2} \qquad \text{Eq. 24}$$

or a combination of different types of functions.

The 2M+1 channels and 2L+1 number of frequencies of recorded data, d, can be written in vector form as $$d = \begin{pmatrix} d(f_{-L}, x_{-M}) \\ \vdots \\ d(f_{-L}, x_M) \\ \vdots \\ d(f_0, x_{-M}) \\ \vdots \\ d(f_0, x_M) \\ \vdots \\ d(f_L, x_{-M}) \\ \vdots \\ d(f_L, x_M) \end{pmatrix} \qquad \text{Eq. 25}$$

We define and discretize the slownesses in in-line $p_x$ and cross-line $p_y$ into $N_p$ slowness values from $p_{min}$ to $p_{max}$, respectively, and we define and discretize the intercept time $\tau_0$ into $N_{\tau_0}$ time steps, from $\tau_0^{min}$ to $\tau_0^{max}$. The resulting model m is written as $$m = \begin{pmatrix} m(p_1, \tau_0^1) \\ \vdots \\ m(p_1, \tau_0^{N_{\tau_0}}) \\ \vdots \\ m(p_{N_p}, \tau_0^1) \\ \vdots \\ m(p_{N_p}, \tau_0^{N_{\tau_0}}) \end{pmatrix} \qquad \text{Eq. 26}$$

The decomposition problem can be written as $$\min\|m\|_1 \text{ or } \min\|m\|_0 \text{ subject to } \|Am-d\|_2 \le \epsilon^2 \qquad \text{Eq. 27}$$

where $$A=(g(x,p_1,\tau_0^1)\ldots g(x,p_1,\tau_0^{N_{\tau_0}})\ldots g(x,p_{N_p},\tau_0^{N_{\tau_0}})), \qquad \text{Eq. 28}$$

and $\epsilon^2$ is the noise power of the data. The interpolated data at locations, $y_0,\ldots,y_{N-1}$, can then be computed by $$d^{interp}=Bm, \qquad \text{Eq. 29}$$

where, for frequency $f_0$, $$d^{interp} = \begin{pmatrix} d^{interp}(f_0, y_0) \\ \vdots \\ d^{interp}(f_0, x_{N-1}) \end{pmatrix} \qquad \text{Eq. 30}$$

and $$B = \left(g(y, p_1, \tau_0^1) \ldots g(y, p_1, \tau_0^{N_{\tau_0}}) \ldots g(y, p_{N_p}, \tau_0^{N_{\tau_0}})\right). \qquad \text{Eq. 31}$$

In accordance with example implementations, a flow of interpolation of the data may proceed as follows.

1. Transform the data into frequency-space domain.
2. Set the reference frequency $f_0$ to the first frequency of the data and select its adjacent frequencies.
3. Compute the multi-frequency basis functions defined by Eq. 22.
4. Construct matrix A in Eq. 23.
5. Solve the optimization problem for m defined by Eq. 27.
6. Compute the interpolated data $d^{interp}$, by using Eqs. 29 and 30.
7. Repeat steps 3 to 6 until all frequencies have been processed.
8. Transform the interpolated data back to time-space domain.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
    receiving data corresponding to at least one first measurement of energy produced by a first shot of an energy source, and corresponding to at least one second measurement of energy produced by a second shot;
    transforming the received data to a domain sensitive to event direction;
    comparing the at least one first measurement in the domain sensitive to event direction with the at least one second measurement in the domain sensitive to event direction, wherein comparing comprises identifying a noise based on the noise being inconsistently located between the at least one first measurement and the at least one second measurement in the domain sensitive to event direction; and
    based at least in part on the comparison, attenuating the noise from the at least one first measurement.

2. The method of claim 1, wherein the domain has a dimension of at least three.

3. The method of claim 1, wherein the domain is selected from the group consisting of:
    a time-inline slowness-crossline slowness domain;
    a frequency-inline wavenumber-crossline wavenumber domain;
    a frequency-inline space-crossline space domain; and
    a three-dimensional curvelet domain.

4. The method of claim 1, wherein comparing comprises determining a shot-to-shot coherence based on the at least one first measurement and the at least one second measurements.

5. The method of claim 1, wherein attenuating the noise from the at least one first measurement comprises filtering to remove content corresponding to the noise or interpolating a signal corresponding to the energy produced by the first shot of the energy source.

6. The method of claim 5, further comprising reverse transforming a result of the filtering to a domain corresponding to a domain of the received data.

7. The method of claim 1, wherein attenuating the noise from the at least one first measurement comprises:
modeling the noise;
transforming the modeled noise into a domain corresponding to a domain of the received data; and
removing the noise based at least in part on the transformed modeled noise.

8. The method of claim 1, further comprising:
de-aliasing at least a portion of the received data.

9. The method of claim 1, further comprising:
transforming at least a portion of the received data into at least one additional domain sensitive to event direction,
wherein the comparing is further based at least in part on the transformation into the at least one additional domain.

10. The method of claim 1, wherein receiving the data comprises receiving seismic data acquired in a survey of a subsurface geologic region.

11. A method comprising:
receiving data corresponding to at least one first measurement acquired by at least one seismic sensor of a least one first shot of a seismic source, and at least one second measurement acquired by at least one seismic sensor of at least one second shot of the seismic source;
transforming the received data to a domain sensitive to event direction;
comparing the at least one first measurement transformed into the domain sensitive to event direction with the at least one second measurement transformed into the domain sensitive to event direction, wherein comparing comprises identifying a noise based on the noise being inconsistently located between the at least one first measurement and the at least one second measurement in the domain sensitive to event direction; and
based at least in part on the comparison, attenuating noise from the at least one first measurement.

12. The method of claim 11, wherein the at least one seismic source comprises a plurality of seismic sources, the method further comprising:
performing source separation using the attenuation of the noise.

13. The method of claim 12, wherein the noise comprises energy not corresponding to a source targeted by the source separation.

14. The method of claim 11, wherein comparing comprises correlating the at least one first measurement with the at least one second measurement based at least in part on the transformation.

15. The method of claim 11, wherein comparing comprises determining a shot-to-shot coherence based at least in part on the at least one first measurement and the at least one second measurements in the domain sensitive to event direction.

16. The method of claim 11, wherein attenuating the noise from the at least one first measurement comprises:
filtering to remove content corresponding to the noise or interpolating a signal corresponding to the first shot, the second shot, or both of the energy source.

17. The method of claim 11, further comprising:
de-aliasing the received data.

18. A system comprising:
an interface to receive data corresponding to at least one first measurement of a first shot produced by an energy source, and corresponding to at least one second measurement of a second shot produced by the energy source; and
a processor-based machine to process the received data to:
transform the received data to a domain sensitive to direction;
compare the at least one first measurement transformed into the domain sensitive to direction with the at least one second measurement transformed into the domain sensitive to direction, wherein comparing comprises identifying a noise based on the noise being inconsistently located between the at least one first measurement and the at least one second measurements in the domain sensitive to event direction; and
based at least in part on the comparison, attenuate noise from the at least one first measurement.

19. The system of claim 18, wherein the processor uses the attenuation of the noise to perform source separation.

20. The system of claim 18, wherein the processor filters to remove content corresponding to the noise or interpolates a signal corresponding to the first shot, the second shot, or both of the energy source.

21. The method of claim 1, further comprising displaying the at least one first measurement after attenuating the noise therefrom.

* * * * *